United States Patent Office 3,432,259
Patented Mar. 11, 1969

3,432,259
MANUFACTURE OF SODIUM METAPHOSPHATE
Robert Harry Edwards, Whitehaven, and Gordon McLaren Biggar, St. Bees, England, assignors to Electric Reduction Company of Canada Ltd., Toronto, Ontario, Canada, a corporation of Canada
No Drawing. Filed July 12, 1965, Ser. No. 471,468
Claims priority, application Great Britain, July 14, 1964, 28,921/64
U.S. Cl. 23—106          9 Claims
Int. Cl. C01b 25/30

ABSTRACT OF THE DISCLOSURE

A process for producing water soluble phosphates of sodium by reacting a mixture of sodium chloride and wet process phosphoric acid having an Na:P ratio of substantially 1:1 on a moving bed of sodium metaphosphate particles at a temperature of between 400° and 530° C., to produce a mixture of soluble and insoluble sodium condensed phosphates. This mixture of phosphates is treated to convert the insoluble sodium phosphates to soluble phosphates. These soluble phosphates are then dissolved in water and insoluble residues are separated therefrom.

---

Of the alkali metal phophates, potassium phosphates find their main commercial use as fertilisers while sodium phosphates are mainly used as sequestering agents, in detergents and other laundering aids, and in food manufacture. These requirements have led to different approaches to the manufacture of the two classes of phosphates. In the case of potassium phosphates the desired compound is potassium metaphosphate and this is usually made by reacting potassium chloride and wet process phosphoric acid at high temperatures. Such a process does not permit removal of the non-volatile impurities contained in the acid, but this is of no significance if the product is to be used as a fertiliser. One process of this kind which has been proposed is to cause potassium chloride and phosphoric acid to react, at a temperature below the fusion point of the product, on a moving bed of inert particles, such as particles of the product itself. The reaction was to be carried out preferable at a temperature above 350° C., temperatures of about 500° C. being specifically described, and the product was said to be Kurrol's salt.

In the case of the sodium phosphates, a variety of phosphates is required for the various purposes mentioned above and the product has to have a relatively high degree of purity. This, for many years, has been achieved by using thermal phosphoric acid for their manufacture usually by neutralising this acid with sodium hydroxide or sodium carbonate to produce sodium ortho-phosphate which may be converted to one of the condensed phosphates such as a pyrophosphate, the tripolyphosphate or a metaphosphate. There has also been a proposal which, so far as we are aware, has not been put into practice, for using a process similar to that described above in relation to the manufacture of potassium metaphosphate to make metaphosphates of alkali metals in general, and sodium in particular, by reacting thermal phosphoric acid with the appropriate alkali metal chloride. Recently processes have been developed for making sodium phosphates of adequate purity from wet process phosphoric acid in which partially purified wet process acid is neutralised, the remaining impurities being removed as precipitates which form during this neutralisation.

It would be economically desirable to make sodium phosphates from sodium chloride and wet process acid but this has not hitherto been considered as a practical proposition in view of the fact that the product would have too low a purity to be of use for most or all of the present uses of sodium phosphates. The impurities would consist chiefly of phosphates of metals other than sodium. The organic impurities in the wet process acid (hereinafter called w.p.a.) would have been partly calcined off during the reaction with the chloride and party carbonised to insoluble materials, According to our invention sodium metaphosphate is obtained in its water-soluble form and a solution is formed, with the result that impurities are precipitated and can be filtered off or otherwise removed.

In order to obtain a good yield of sodium metaphosphate by reacting NaCl with phosphoric acid, and to secure evaporation of water at a rate adequate to prevent formation of sticky deposits, temperatures above about 250° C. must be used. The metaphosphate can exist in a variety of polymeric forms, of which sodium trimetaphosphate (hereinafter called STMP) is soluble in water and the other crystalline forms (hereinafter collectively called ISMP) are insoluble. We have found that in general the product of the NaCl/w.p.a. reaction is a mixture of STMP and ISMP in a proportion depending mainly on the temperature of the reaction and the nature of the bed in which it is conducted.

Our invention consists in a process for producing a phosphate or mixture of phosphates of sodium which comprises depositing a mixture of sodium chloride and w.p.a. with an Na:P ratio of substantially 1:1 on a moving bed of sodium metaphosphate particles at a temperature above 250° C., but nowhere exceeding the melting point of STMP, removing sodium metaphosphate from the bed, dissolving the STMP in water, removing the insoluble material, and recovering the STMP or converting it to another sodium phosphate.

The sodium metaphosphate produced by the calcining operation may vary in composition in a spectrum from nearly 100% ISMP to nearly 100% STMP. In general the desired product is STMP. To obtain this in preference to ISMP it is necessary to work at a high temperature, but we find that the margin between the temperature at which 100% STMP is obtained and the melting point of the product is rather narrow and it is not always possible to ensure production of 100% STMP even with the most favourable moving bed system. The temperature of operation should preferably be above 400° C. to obtain a substantial proportion of STMP. While it would be possible in a homogeneous system to operate near the melting point (628° C.), with the introduction of cold feedstock the average temperature must be lower than this if local overheating is to be avoided. An upper limit for the average bed temperature which gives a margin of safety for the avoidance of fusion is 530° C.

The other main factor that we have found influences the proportion of STMP to ISMP is the nature of the moving bed of particles on or in which the reaction takes place. Two types of moving bed may be used: a stirred bed in a stationary container, which favours the production of ISMP; or a bed contained in a rotating drum provided with means for removing a small proportion of the particles from the bed and returning them to another part of the bed throughout the reaction. This second method favours the production of STMP. Using this type of apparatus and a bed temperature of 530° C. it is possible to approach the production of 100% STMP, although fortuitous or uncontrollable factors make it impossible to be sure of obtaining this result on every run. In any case the process is advantageously carried out continuously, i.e. with the continuous introduction of quantities of feedstock and removal of corresponding quantities of product that are small in relation to the size of the bed.

The Na:P ratio of the mixture fed to the kiln is substantially 1.0:1. Preferably the ratio is a little below 1.0. The higher the ratio the greater the economic advantage of using NaCl instead of alkali as the sodium source for the phosphate, but also the higher the proportion of NaCl that remains unreacted. However, the proportion of NaCl in the product for a given Na:P ratio is less, the higher the temperature of the reaction. Thus at 300–400° C. the ratio should be 0.85–0.90:1 to give a product containing not more than 0.6% NaCl, while at 500° C. the ratio can be 0.95:1.

The w.p.a. used as starting material may be crude 30% acid direct from the gypsum filter (in the specifications of w.p.a. are referred to in terms of $P_2O_5$ content by weight) but it is preferred to remove some of the sulphate content so as to reduce it to 3 to 9% $SO_3$ by weight of the $P_2O_5$. The salt should be in powder form and is preferably ground to a size such that substantially 100% passes a 100 BSS sieve and more than 50% a 300 BSS sieve. The mixture of salt and w.p.a. has the form of a slurry.

It is preferable to remove some of the water from the 30% w.p.a. before the latter enters the kiln. The acid may advantageously be concentrated to at least 48%, but we have found that it should not exceed 65% since otherwise sticking and agglomeration may occur. Moreover, if relatively coarse salt, with a residue of more than 60% retained by a 300 BSS sieve, is used the concentration of the w.p.a. should be kept below 50% or else a product with a substantial quantity of unconverted NaCl is obtained unless unduly long residence times are employed.

The organic matter originally present in the w.p.a. serves a useful purpose in the invention, since it reduces during the calcining reaction the sulphate which is also normally present in the acid, to give $SO_2$ which escapes. The amount of organic matter varies widely with the phosphate rock used as raw material, and the amount of sulphate can be made to vary widely according to the extent of desulphation to which the w.p.a. is subjected. If there is not enough organic matter to reduce all the sulphate, another source of carbon such as charcoal, coal or organic compounds such as carbohydrates may be added. As mentioned above, we prefer to desulphate the w.p.a. to a certain extent, both to save the sulphate value and to avoid having to add extra carbon.

The by-product of the reaction is hydrogen chloride. In one way of carrying out the invention the kiln may be so arranged that the HCl is collected in as pure a form as possible. This concentrated HCl gas may be used for a variety of purposes and particularly for making chlorine. Alternatively, a simple open kiln provided with lifting and recycling arrangements may be used. If, as will normally be the case, the kiln is heated by combustion gases then the HCl will be diluted and can only be recovered in a simple operation in the form of relatively dilute HCl solution certainly below 18% and probably below 12% concentration. This dilute HCl may be used for example for making phosphoric acid or di-calcium phosphate.

If the metaphosphate product of the reaction between the salt and w.p.a. is substantially all STMP, it is purified by dissolving it in water. The impurities consist mainly of insoluble phosphates of a number of metals which were present in the phosphate rock used to make the w.p.a. There may also be a little NaCl, in a quantity of the order of one half percent, but this is not removed by the process of the invention, and is not sufficiently great to be deleterious for most uses of sodium phosphates. The insoluble phosphate impurities are removed from the solution in the ordinary way by filtration or centrifuging.

If, as is more likely to be the case, the product is a mixture of STMP and ISMP, the STMP may be leached out and separated from the ISMP and insoluble impurities.

The STMP may be recovered from the solution by crystallisation or it may be converted into sodium tripolyphosphate by hydrolysis in an alkaline solution. As an alternative, we have found that the STMP can be hydrolysed to sodium orthophosphate by heating it at a temperature of about 115° C. in a solution of $NaH_2PO_4$ containing at least 30% and preferably at least 40% of $P_2O_5$, for up to an hour.

Where there is any substantial proportion of ISMP in the product of the NaCl/w.p.a. reaction it is normally necessary to convert it into a soluble phospate, as there are few uses for the ISMP. According to a feature of our invention, the metaphosphate product or the ISMP after dissolving out the STMP is treated with water at a temperature of at least 150° C., preferably at least 175° C., whereby the ISMP and any STMP present are hydrolysed to form sodium orthophosphate. The resulting solution has suspended in it the insoluble phosphate impurities, and these are removed by filtration or centrifuging. We have found that the condensed phosphates of Al and Fe formed in the reaction are not significantly hydrolysed and the condensed phosphates of Mg and Ca are only partly hydrolysed, so that this process substantially frees the orthophosphate solution of metals other than sodium. It is an advantage of this process that the impurity metals present with the sodium metaphosphate catalyse its hydrolysis. The resulting orthophosphate may be converted to tripolyphosphate by known methods.

An alternative method of converting the ISMP in the product of the NaCl/w.p.a. reaction into a soluble material is to heat the product to a temperature between 500° C. and 580° C. and to hold it at the high temperature for a sufficient time. This procedure converts the ISMP to STMP but leaves unchanged any STMP originally present. The heating may advantageously be carried out over a period of 30 minutes at a temperature of 570° C. The product is dissolved in water and the resulting solution of STMP contains the phosphate impurities in suspension and these are removed in the usual way. The purified solution may be worked up as described above.

Yet another way of making a useful product from the crude metaphosphate formed in the reaction is to fuse either the whole product or the ISMP after dissolving out the STMP, at a temperature above the fusion point of STMP and then to cool it rapidly. The glass which is formed thereby is a rather impure polyphosphate glass and may be used for softening water, stabilising drilling muds, etc. Glasses having any of the standard Na:P ratios such as 1.00:1, 1.02:1, 1.07:1 or 1.10:1 may be made in this way, the Na:P ratio of the crude metaphosphate product being adjusted if necessary by the addition of a sodium compound such as $Na_2CO_3$.

The insoluble residues obtained from the processes described above and consisting of polyphosphates of certain heavy metals and alkaline earth metals may be worked up by various methods. For example they may be digested with phosphoric acid in the ratio of at least two parts of $P_2O_5$ in the acid for every part of $P_2O_5$ in the residue. 30% w.p.a. may conveniently be used. The resulting solution may be used for making fertiliser, feeding stuffs or sodium phosphate. Instead of digesting the residues in phosphoric acid, sulphuric acid may be used. In this case preferably one part by weight of $H_2SO_4$ per part of $P_2O_5$ in the residue is used.

Alternatively the residues may be dissolved in known manner in a hot solution of sodium hydroxide.

What we claim is:
1. The process for producing water soluble sodium trimetaphosphate comprising reacting a mixture of sodium chloride and wet process phosphoric acid having an Na:P ratio of substantially 1:1 on a moving bed of sodium metaphosphate particles at a temperature of between 400° and 530° C., whereby a mixture of soluble and insoluble sodium condensed phosphates is obtained, heating said mixture of soluble and insoluble condensed phosphates to a temperature between 500° and 580° C. and holding it at that temperature until said insoluble phosphates are converted into soluble phosphates, and filtering off any insoluble residues.

2. The process for producing water soluble sodium tripolyphosphate comprising reacting a mixture of sodium chloride and wet process phosphoric acid having an Na:P ratio of substantially 1:1 on a moving bed of sodium metaphosphate particles at a temperature of between 400° and 530° C., whereby a mixture of soluble and insoluble sodium condensed phosphates is obtained, hydrolizing said mixture in solution by addition thereto of an alkali to convert said mixture to sodium tripolyphosphate, and filtering off any insoluble residues.

3. The process for producing water soluble sodium orthophosphate comprising reacting a mixture of sodium chloride and wet process phosphoric acid having an Na:P ratio of substantially 1:1 on a moving bed of sodium metaphosphate particles at a temperature of between 400° and 530° C., whereby a mixture of soluble and insoluble sodium condensed phosphates is obtained, converting said mixture of soluble and insoluble sodium condensed phosphates in solution to soluble sodium orthophosphate by heating at a temperature of about 115° C. with an aqueous solution of sodium trihydrogen phosphate containing at least 30% by weight of $P_2O_5$, and filtering off any insoluble residues.

4. The process for producing water soluble sodium orthophosphate comprising reacting a mixture of sodium chloride and wet process phosphoric acid having an Na:P ratio of substantially 1:1 on a moving bed of sodium metaphosphate particles at a temperature of between 400° and 530° C., whereby a mixture of soluble and insoluble sodium condensed phosphates is obtained, heating said insoluble sodium condensed phosphates in water at a temperature of at least 150° C. whereby the insoluble sodium condensed phosphates are converted into sodium orthophosphate, and filtering off any insoluble residues.

5. The process of claim 1, 2, 3, or 4, wherein said moving bed is contained in a rotating drum provided with means for removing a small proportion of the particles from the bed and returning them to another part of the bed throughout the reaction, and
wherein there is used wet process phosphoric acid with with a concentration of 48 to 65% $P_2O_5$ having a sulphate content of 3.0 to 9.0% $SO_3$ by weight of the $P_2O_5$.

6. The process of claim 1, 2, 3, or 4, wherein said moving bed is contained in a rotating drum provided with means for removing a small proportion of the particles from the bed and returning them to another part of the bed throughout the reaction, and
wherein there is used sodium chloride of particle size such that more than 60% is retained by a 300 British Standard Sieve sieve, and wet process phosphoric acid of concentration less than 50% $P_2O_5$ having a sulphate content of 3.0 to 9.0% $SO_3$ by weight of the $P_2O_5$.

7. The process of claim 1, 2, 3, or 4, wherein said moving bed is contained in a rotating drum provided with means for removing a small proportion of the particles from the bed and returning them to another part of the bed throughout the reaction,
wherein there is used wet process phosphoric acid with with a concentration of 48 to 65% $P_2O_5$ having a sulphate content of 3.0 to 9.0% $SO_3$ by weight of the $P_2O_5$, and
wherein carbon or a carbonaceous material is added in a quantity sufficient to ensure reduction of the sulphate content of the reaction mixture to $SO_2$.

8. The process of claim 1, 2, 3, or 4, wherein said moving bed is contained in a rotating drum provided with means for removing a small proportion of the particles from the bed and returning them to another part of the bed throughout the reaction.

9. The process of claim 1, 2, 3, or 4, wherein there is used sodium chloride of particle size such that substantially 100% passes a 100 British Standard Sieve sieve and more than 50% passes a 300 British Standard Sieve sieve.

References Cited

UNITED STATES PATENTS

| 2,365,190 | 12/1944 | Hatch. | |
| 3,049,419 | 8/1962 | Raistrick et al. | 71—64 |
| 3,314,750 | 4/1967 | Shen | 23—106 |
| 3,347,627 | 10/1967 | Shen | 23—107 |

FOREIGN PATENTS 6414612   6/1965   Netherlands.

EARL C. THOMAS, *Primary Examiner.*

L. A. MARSH, *Assistant Examiner.*